United States Patent Office 3,394,163
Patented July 23, 1968

3,394,163
PREPARATION OF BIS(FLUOROXY)DIFLUOROMETHANE (U)
James L. Kroon, Midland, Mich., assignor to The Dow Chemical Company, Midland, Mich., a corporation of Delaware
No Drawing. Filed Jan. 17, 1964, Ser. No. 338,524
4 Claims. (Cl. 260—453)

This invention relates to a process for preparing fluoroorganic compounds and more particularly is concerned with a novel process for preparing bis(fluoroxy)difluoromethane [$CF_2(OF)_2$].

Heretofore bis(fluoroxy)difluoromethane has been prepared by the fluoroination of sodium trifluoroacetate. This method of preparation suffers from the disadvantages that exceedingly low yields of product apparently are obtained and sodium trifluoroacetate reactant is relatively expensive.

Now unexpectedly, it has been found in the present novel process that bis(fluoroxy)difluoromethane readily can be prepared by direct fluoroination of relatively inexpensive alkali metal oxalates.

More particularly the present process comprises treating an agitated mass of an alkali metal oxalate, preferably sodium oxalate, at a low temperature of from about 0 to about 10° C., with fluorine in the presence of an alkali metal or alkaline earth metal fluoride. The exit gases from the reactor are collected and the bis(fluoroxy)difluoromethane product separated therefrom.

The reaction time to be employed is not critical but at a minimum is that which allows for controlled introduction of a predetermined amount of fluorine into the reactor. The actual reaction time can be determined in part by noting the reactor temperature. During the reaction the heat of fluoroination raises the reactor temperature a small amount. As the reaction is complete, the temperature again returns to that of the bath.

Conveniently, the reaction is carried out at atmospheric pressure although superatmospheric pressures can be used if desired.

Usually the product gas stream exiting from the reaction is condensed by passing through a cold trap. The bis(fluoroxy)difluoromethane product readily is recovered from the condensed product mass by fractionation or other separation techniques.

The reaction is carried out in a reactor and using processing, handling and transporting equipment which does not undergo detrimental degradation in the presence of the reactant or product materials. Ordinarily metal equipment of Monel alloy, nickel, stainless steel and the like materials are employed.

The actual amount of fluorine employed ranges from about stoichiometric to about 20 weight percent in excess of stoichiometric based on that required for reaction with the oxalate. For ease in handling, as well as to provide for increased agitation by introduction of larger volumes of gas into the reaction mixture ordinarily the fluorine is admixed with an inert gas, for example, argon or nitrogen. The ratio of fluorine to inert gas to be employed is not critical. The fluorine containing gas mixtures usually range from about 10 to about 40 volume percent fluorine and from about 90 to about 60 volume percent inert gas and preferably contains from about 14 to about 24 volume percent fluorine, balance inert gas.

The weight proportion of alkali metal oxalate/alkali or alkaline earth metal fluoride in the reaction mixture ranges from about 1/25 to about 1/2. Ordinarily, the reaction mixture employed contains these materials in proportions ranging from about 1/4 to about 1/6.

Although any of the alkali metal fluorides, including lithium fluoride or alkaline earth metal fluoride including magnesium fluoride can satisfactorily be employed in the present process, preferably sodium fluoride is used. Likewise, any of the alkali metal oxalates are satisfactory for use as reactant; sodium oxalate is preferred. For optimum yields, the reactants are employed in a substantially dry condition.

The following example will serve to further illustrate the present invention but is not meant to limit it thereto.

Example.—A one-liter, three-necked Monel flask was fitted with a stirrer, gas inlet tube and gas outlet tube. About 7.5 grams of sodium oxalate and about 30 grams of oven-dried sodium fluoride (sodium oxalate/sodium fluoride of 1/4) were added to the flask. The flask was immersed in an ice-water mixture, the contents agitated and after the flask temperature had reached about 0° C., fluorine admixed with nitrogen was introduced into the reactor. A nitrogen flow of about 160 cubic centimeters per minute was first started into the reactor and fluorine then mixed therewith until the total gas flow into the reactor was about 210 cubic centimeters per minute. This is equivalent to a gas mixture containing about 24 volume percent fluorine and about 76 volume percent nitrogen. The gas flow was continued for about 2.5 hours. During this period, the reaction mass was stirred continuously.

The exit gases from the reactor were passed through a trap positioned in a bath of dichlorodifluoromethane which was kept at or near its freezing point of about minus 158° C. by the frequent addition of liquid nitrogen.

Following the reaction period, the condensed product mass was removed from the trap and passed through a tube of Linde 4A molecular sieves to remove any carbon dioxide present therein. The substantially carbon dioxide-free product mass then was distilled and provided bis(fluoroxy)difluoromethane.

The product $CF_2(OF)_2$ is a gas at room temperature, liquefying at about minus 62° C. NMR spectrum of the bis(fluoroxy)difluoromethane showed a triplet at $-159.1$ $\phi$ assigned to OF groups, a triplet at $+84.3$ $\phi$ assigned to the $CF_2$ group and its $J_{FF}$ was 38.1 cps. These data are in good agreement with those reported in the classified literature for bis(fluoroxy)difluoromethane, $CF_2(OF)_2$.

A number of runs were made wherein the sodium oxalate/sodium fluoride weight proportions were varied from 1/25 to 1/3.6 and fluorine concentration in a nitrogen-fluorine feed gas admixture was about 14, 20 or 24 volume percent. In all of the runs bis(fluoroxy)difluoromethane product of high purity was readily produced and recovered.

In a manner similar to that described for the foregoing example, similar reaction mixtures of sodium, potassium or other alkali metal oxalates with lithium fluoride, sodium fluoride, potassium fluoride, calcium fluoride, magnesium fluoride or other alkali metal or alkaline earth metal fluoride can be fluorinated to produce bis(fluoroxy)difluoromethane in accordance with the present novel process.

Various modifications can be made in the present process without departing from the spirit or scope thereof for it is understood that I limit myself as defined in the appended claims.

I claim:
1. A process for preparing bis(fluoroxy)difluoromethane which comprises;
  (a) providing in a reactor a mixture of an alkali metal oxalate and a member selected from the group consisting of alkali metal fluoride and alkaline earth metal fluoride, the weight proportions of said oxalate compound and said fluoride compound in said mixture ranging from about 1/25 to about 1/2,
  (b) introducing fluorine into the mixture of said alkali metal oxalate and said fluoride while maintaining the reaction mixture at a temperature of from about 0 to about 10° C.,

(c) collecting the exit gases from said reactor, and
(d) recovering bis(fluoroxy)difluoromethane therefrom.

2. The process as defined in claim 1 wherein sodium oxalate and sodium fluoride are employed in admixture.

3. The process as defined in claim 1 and including the step of introducing fluorine into the reactor as an admixture with an inert gas, the amount of said fluorine at a minimum being that required to react stoichiometrically with said alkali metal oxalate.

4. A process for preparing bis(fluoroxy)difluoromethane which comprises;
(a) providing in a reactor a mixture of sodium oxalate and sodium fluoride, the weight proportions of said sodium oxalate to said sodium fluoride being about 1/4,
(b) introducing with agitation a gaseous mixture of fluorine and nitrogen into said mixture of said sodium oxalate and said sodium fluoride while maintaining the reaction temperature at about 0° C., said gaseous mixture containing about 24 volume percent fluorine and about 76 volume percent nitrogen,
(c) removing the gaseous product mass from said reactor,
(d) condensing said product mass, and
(e) recovering bis(fluoroxy)difluoromethane therefrom.

References Cited

UNITED STATES PATENTS 2,689,254   9/1954   Cady et al. _____ 260—453

OTHER REFERENCES

Hoffman, Chemical Review, vol. 64, pp. 91 to 98 (1964).

CHARLES B. PARKER, *Primary Examiner.*

S. T. LAWRENCE III, *Assistant Examiner.*